United States Patent [19]

Meyers

[11] Patent Number: 4,871,380
[45] Date of Patent: Oct. 3, 1989

[54] CARTRIDGE MOUNT FOR POWDER COLLECTOR

[75] Inventor: Reuven I. Meyers, Minneapolis, Minn.

[73] Assignee: Nordson Corporation, Westlake, Ohio

[21] Appl. No.: 229,431

[22] Filed: Aug. 8, 1988

[51] Int. Cl.⁴ ............................................. B01D 46/00
[52] U.S. Cl. .......................................... 55/350; 55/484; 55/498; 55/502; 55/509
[58] Field of Search ................. 55/350, 484, 498, 502, 55/507, 509; 210/323.2

[56] References Cited

U.S. PATENT DOCUMENTS

| | | | |
|---|---|---|---|
| 2,521,060 | 9/1950 | Hallinan | 55/484 |
| 4,105,562 | 8/1978 | Kaplan et al. | 210/323.2 |
| 4,277,260 | 7/1981 | Browning | 55/273 |
| 4,298,474 | 11/1981 | Sillers | 55/350 |
| 4,395,269 | 7/1983 | Schuler | 55/302 |
| 4,504,293 | 3/1985 | Gillingham et al. | 55/350 |
| 4,545,324 | 10/1985 | Browning | 118/634 |
| 4,704,953 | 11/1987 | Wilson | 55/350 |
| 4,723,505 | 2/1988 | Wilson | 55/356 |
| 4,775,398 | 10/1988 | Howeth | 55/498 |

*Primary Examiner*—Bernard Nozick
*Attorney, Agent, or Firm*—Wood, Herron & Evans

[57] ABSTRACT

A powder collector having spaced parallel walls, one wall having at least one discharge opening. Three triangularly-positioned rods between the walls form a cage to retain a cartridge. A cartridge is positioned in the cage between the walls with an open end surrounding the opening in the wall. A screw in the wall opposite the opening presses the cartridge and a gasket between the cartridge and the wall against the opposed wall to seal the cartridge in the collector.

7 Claims, 2 Drawing Sheets

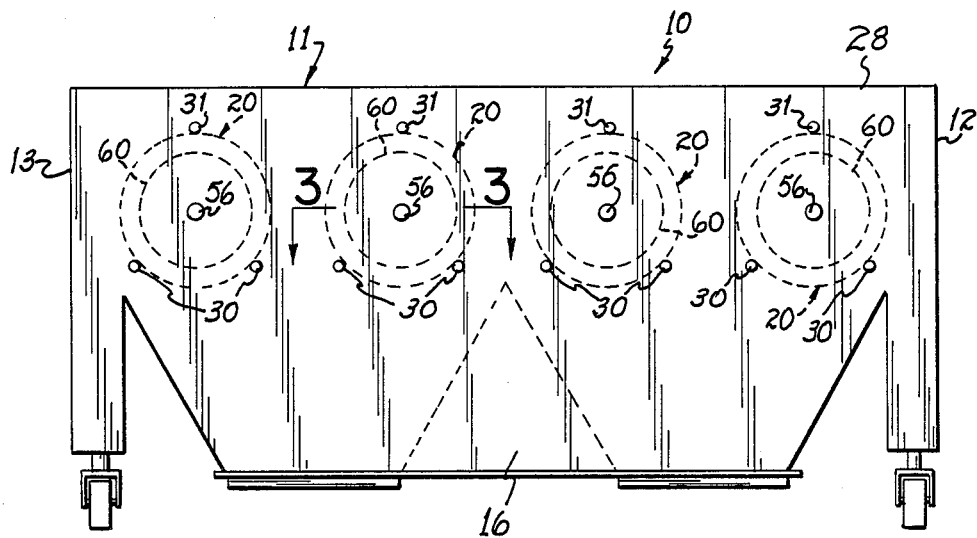
FIG. 2
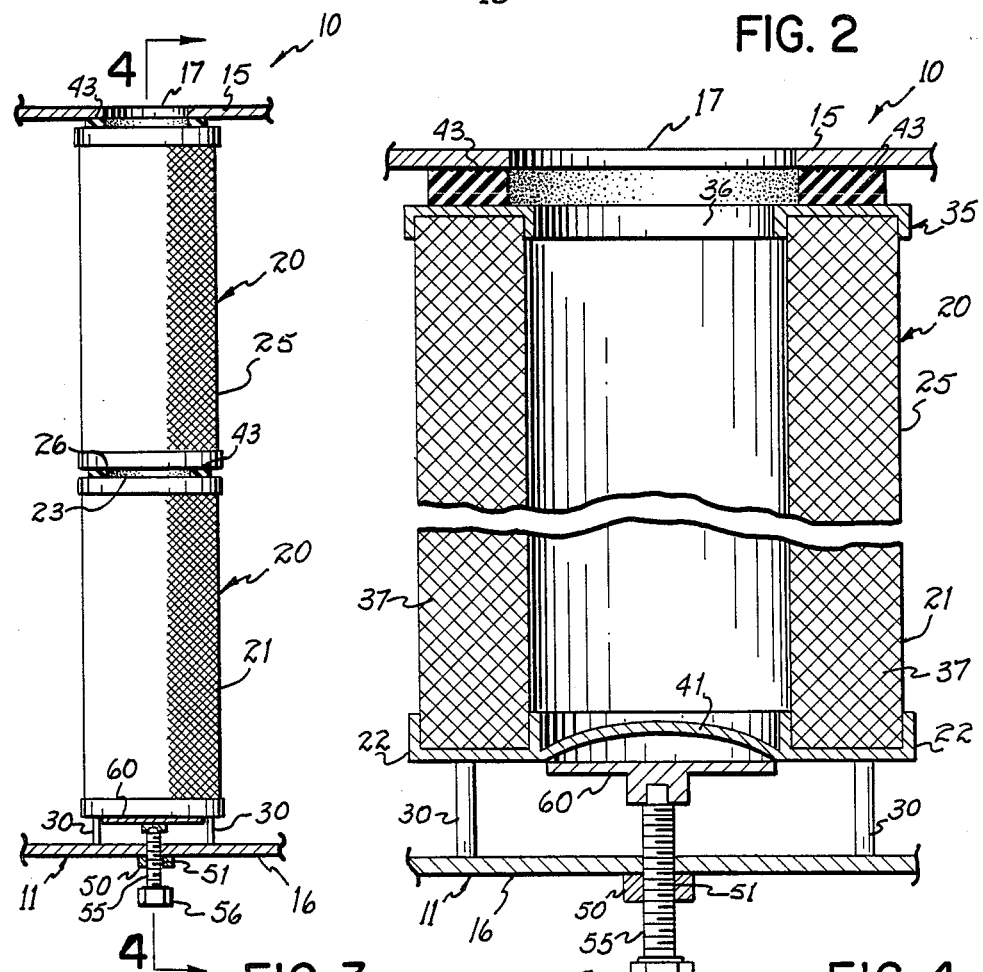
FIG. 3
FIG. 4

CARTRIDGE MOUNT FOR POWDER COLLECTOR

This invention relates to a powder collector for a powder booth, and more particularly, the invention is directed to the sealed mounting of cartridges in the collector.

BACKGROUND OF THE INVENTION

The powder booth is well known, and one form of it is described in U.S. Pat. No. 4,723,505. The powder booth has a chamber through which an object to be finished with powder is conveyed. Electrostatic guns fire powder into the atmosphere surrounding the object to be finished, and much of the powder adheres to that object. The remainder of the powder is conveyed by airflow and gravity through the powder booth to a collector. Collectors generally have a filter medium through which the air from the powder booth is drawn, the powder being arrested by the medium. Reverse pulses are from time to time introduced into the reverse side of the medium to knock the powder off the medium, thereby preventing its being clogged. The thus filtered air is then directed through a final filter and into the plant atmosphere. The final filter is provided to assure the cleanliness of the air that is introduced into the plant.

In the powder booth of U.S. Pat. No. 4,723,505, the powder collector consists of a housing that is mounted on castered wheels so that it can be rolled into and out of position adjacent the powder booth, thereby permitting the quick changeover from one color powder to another. The housing has opposed walls with opposed openings in the walls. Extending across the housing is a triangular tower structure formed of three triangularly-spaced rods, the rods being cantilevered from one end of the housing adjacent the air outlet opening. The free end of the tower has a plate and a bolt projecting from the plate, the plate and bolt being located adjacent the opposite opening. A hollow cylindrical cartridge is mounted in the collector adjacent each opening by sliding it over the tower structure. A plate is bolted onto the projecting nut with the bolt tightening the plate against the cartridge and against the wall of the housing. Gaskets are provided at the ends of the cartridge, and a gasket between the plate and the housing wall is provided in order to seal the cartridge within the collector.

The structure described normally provides a satisfactory seal. However, when a collector is transported from the factory to the finisher, tightened bolts become loosened and leakage can occur. Further, if the housing, which is formed of sheet metal, is manufactured slightly out of true so that the opposed walls are not precisely parallel to one another, the clamping of gaskets is not uniform and leakage can occur.

The consequence of leakage is that the powder that leaks past the cartridge flows to the final filter and rapidly builds up on the final filter. When the final filter plugs up due to the flow of excess powder onto it, air ceases to flow from the spray chamber through the collector and the recycle system totally breaks down.

If leakage occurs, it normally requires a mechanic to make the adjustments necessary to stop the leakage.

BRIEF DESCRIPTION OF THE INVENTION

It has been an objective of the present invention to provide a collector for a powder booth wherein the cartridge is mounted in such a rigid support system that a single bolt tightening the cartridge against a single gasket provides a simple and reliable seal.

It has been another objective of the invention to replace the four-gasket system of U.S. Pat. No. 4,723,205 with a two-gasket system.

The foregoing objective of the invention is attained by creating a rugged cage in the collector housing to receive the cartridge. The cartridge has a closed end and an open end, the open end being adapted to surround the discharge opening in the collector housing. A clamping screw is mounted on the closed wall to press against the closed end of the cartridge, thereby driving the open end of the cartridge against the opposed wall with a gasket compressed between the cartridge and the opposed wall. More specifically, the rugged cage for each cartridge is provided by welding two spaced parallel rods between the opposed walls, the two opposed rods providing a support or saddle onto which the cartridge is placed. Once the cartridge is in place, a third rod is bolted across the top of the cartridge so that the cartridge is surrounded by an equiangular configuration of rods secured to the opposed walls. A bolt is threaded into the closed wall and carries at its inner end a clamping plate that engages the closed end of a cartridge. When the bolt is tightened to drive its inner end inwardly against the cartridge, the opposite end of the cartridge, carrying a gasket, is forced against the opposed wall around the discharge opening therein.

With the foregoing mounting of a cartridge in the collector, typically four cartridges would be mounted side-by-side, the possibility of leakage around the open end of the cartridge is eliminated. Should the clamping bolt become loosened, it is a very simple matter to tighten it, thereby eliminating any leakage problem.

In addition to minimizing the possibility of leakage, the present invention facilitates installation, increases structural integrity, reduces the cost of the collector, and in simplifying the collector improves it aesthetically.

The several objectives and features of the invention will become more readily apparent from the following detailed description taken in conjunction with the accompanying drawings in which:

FIG. 2 is a side elevational view of the collector;

FIG. 3 is a cross-sectional view taken along lines 3—3 of FIG. 2;

FIG. 4 is an enlarged fragmentary cross-sectional view taken along lines 4—4 of FIG. 3.

Figures 1, 5:
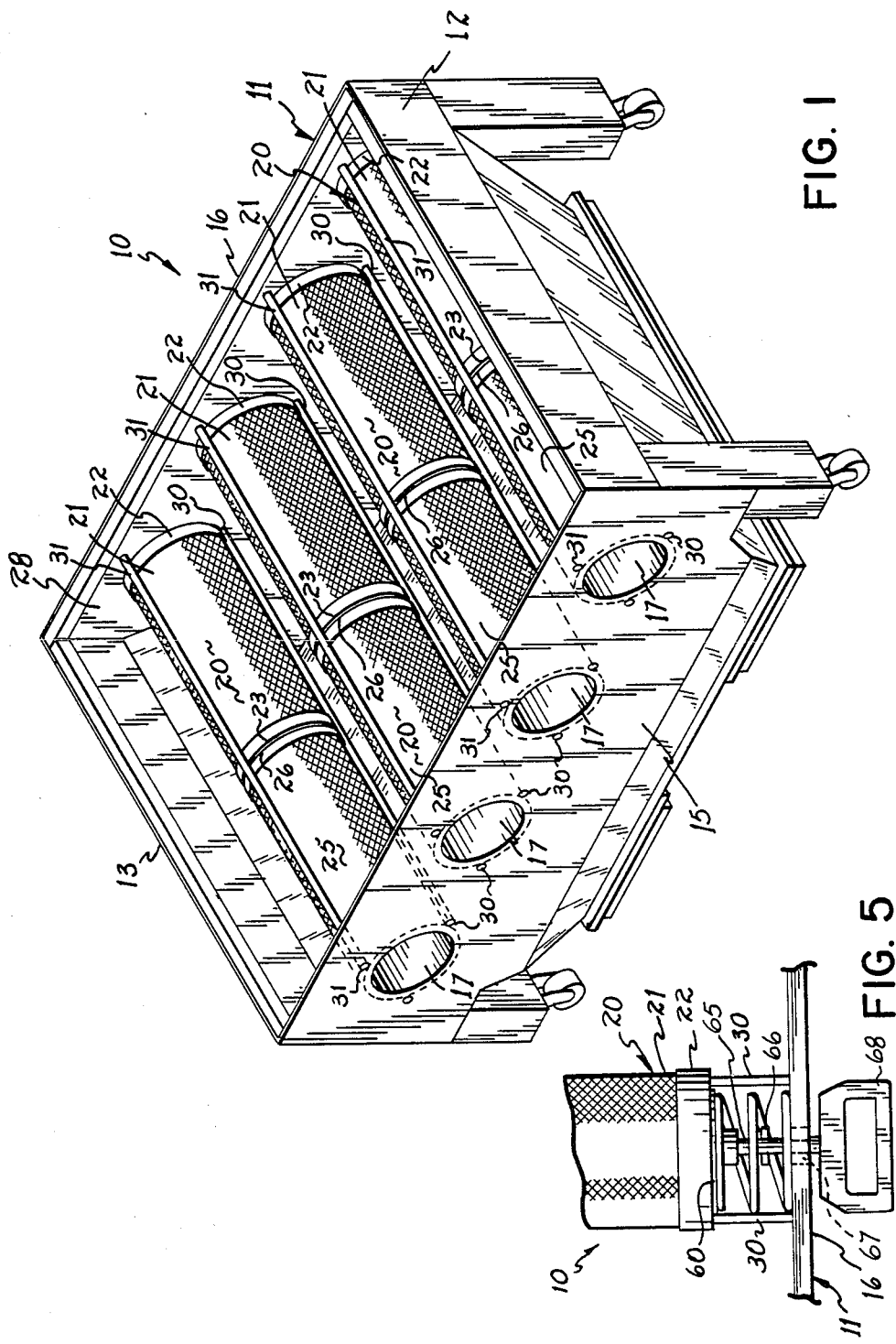
FIG. 1 is a perspective view of a collector in accordance with the present invention.
FIG. 5 is a fragmentary elevational view of an alternative embodiment.

Referring to FIG. 1, the powder collector is shown at 10 and includes a housing 11 formed of two end walls 12 and 13 and two side walls 15 and 16. Side wall 15 has four discharge openings 17. The opposed wall 16 is closed. Four cartridges 20 are mounted in the collector between the walls 15 and 16. The cartridges are preferably formed in two sections. Section 21 has a closed end cap 22 and an open end 23. The adjacent cartridge section 25 has two open ends 26. A circular gasket is placed between the two sections 21 and 25, and a gasket is placed between the open end 26 and the wall 15 so as to seal the cartridge around the opening 17.

The housing has an open top 28 that will be clamped snugly against an opening in the spray chamber where product is sprayed with powder. Air laden with excess powder flows through the open top 28 of the collector and against the cartridges. The cartridges arrest the flow of powder while the thus cleaned air passes through the openings 17 and onto a final filter, not shown. See U.S. Pat. No. 4,723,505, the disclosure for which is specifically incorporated herein for reference, for a description of the complete powder booth.

Referring to FIGS. 2 through 4, the manner in which the cartridges are supported and sealed in the housing is disclosed. For each cartridge a pair of spaced parallel rods 30 extend between the two walls 15 and 16 to form a saddle or support for the cartridge. The rods 30 are preferably welded permanently into place between the two walls 15 and 16. A third rod 31 has a head on one end and is threaded on the other end so that it can be removably mounted across the span between the two walls 15 and 16. The rods surround the opening 17 so that when the cartridge is in position surrounded by the rods, the open end of each cartridge is aligned with a respective opening 17.

The cartridge section 21 has a ring-shaped cap 35 presenting an opening 36 through which air can flow. The cartridge is an elongated hollow member formed principally by filter media 37. The opposite end of the cartridge has the closed end cap 22, the end cap 22 having a central recess 41 of about 8" diameter. A rectangular cross section ring-shaped gasket is adhesively-secured to the open end cap 35. The gasket is rectangular in cross section, being about 1" across and ½" thick. It has an exposed surface 43 in the form of a sawtooth to provide sealing points. The gasket is a silicone rubber of about 80 durometer. Identical gaskets are provided between the cartridge sections 21' and 25 and the cartridge 25 and the housing wall 15.

A torque nut 50 is welded to the wall 16 around an opening 51 in the wall. A threaded rod 55 is threaded into the torque nut 50. A head 56 is provided at one end of the rod for rotating the rod to clamp the cartridges. The opposite end of the rod is rotatably mounted to a compression plate 60 which is slightly less than 8" in diameter so that it seats in the recess 41 of the end cap 22.

In operation, four cartridges with closed end caps 22 are placed on the lower rods 30 with the closed end caps adjacent the walls 16. Cartridge sections 25 having open ends are placed on the rods 30 with the gasket end of the cartridge section being against the wall 15 so that the gasket surrounds the opening 17. The rods 31 are inserted and tightened across the two walls 15 and 16. Thus, the cartridges are securely mounted in a rugged cage formed by the walls 15, 16 and the rods 30, 31.

Each threaded rod 55 is tightened to rotate it inwardly, thereby positioning the compression plate 60 against the end cap 22 to compress the two gaskets and to securely mount the cartridge sections against leakage between the spaced walls of the collector housing.

As shown in FIG. 5, the compression sealing may be performed by a spring-loaded clamping plate instead of the threaded rod 55. The clamping plate 60 is mounted on a smooth rod 65. A compression spring is mounted between wall 16 and plate 60 to urge the plate against the cartridge. The rod carries a transverse pin 66 which can pass through a slot 67 in wall 16. To make the installation, withdraw rod 65 by pulling on handle 68 until the pin 66 passes through slot 67. Twist the handle to misalign pin 66 with respect to slot 67, thereby holding the rod withdrawn. Insert the cartridge sections and return the rod to its original position. With this embodiment, the spring pressure on the cartridge is always uniform and does not depend on the degree to which the workman tightens a screw.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

I claim:

1. A powder collector comprising:
   a housing including first and second spaced parallel walls,
   the first said wall having an opening,
   a cartridge disposed horizontally between said walls, said cartridge including an elongated hollow member formed of filter media and a closed end cap on one end and an open end cap on the other end,
   means forming a cage between said walls surrounding said cartridge to position and support said cartridge horizontally in said housing,
   said open end cap overlying the opening in said first wall,
   a gasket between said end cap and said first wall, said gasket surrounding the opening in said first wall,
   means compressing said gasket between said first wall and said end cap having an opening,
   said compressing means comprising a rod passing through said second wall and substantially coaxial with said filter, and means for forcing said rod against said closed end cap.

2. A collector as in claim 1 in which said cartridge is formed by two separable end-to-end hollow members, and a gasket between said hollow members.

3. A powder collector as in claim 1 in which said compressing means comprises:
   a rod slidable in said second wall having a plate attached thereto,
   and a compression spring urging said plate against the closed end cap of said cartridge.

4. A power collector as in claim 1 in which said compressing means comprises:
   a screw threaded in said second wall and engageable with said closed end cap,
   said screw having a head projecting beyond said second wall.

5. A collector as in claim 4 further comprising:
   said screw having an inner end adjacent said closed end cap,
   and a plate rotatably mounted on said inner end and engageable with said closed end cap.

6. A collector as in claim 1 in which said cage includes:
   a pair of spaced rods extending between said spaced walls and tying said walls together into a rigid structure, said cartridge seated on said rods.

7. A collector as in claim 6 further comprising:
   a third rod parallel to said pair of rods and overlying said cartridge, said third rod being removably bolted to said spaced walls to provide a rigid cage currounding said cartridge.

* * * * *